US007010332B1

(12) United States Patent
Irvin et al.

(10) Patent No.: US 7,010,332 B1
(45) Date of Patent: Mar. 7, 2006

(54) WIRELESS HEADSET WITH AUTOMATIC POWER CONTROL

(75) Inventors: David R. Irvin, Raleigh, NC (US); I. Nelson Wakefield, Cary, NC (US)

(73) Assignee: Telefonaktiebolaget LM Ericsson(publ), (SE)

( * ) Notice: Subject to any disclaimer, the term of this patent is extended or adjusted under 35 U.S.C. 154(b) by 0 days.

(21) Appl. No.: 09/507,586

(22) Filed: Feb. 21, 2000

(51) Int. Cl.
  H04B 1/38 (2006.01)
  H04M 1/00 (2006.01)

(52) U.S. Cl. ............................. 455/575.2; 455/575.1; 455/41.1; 455/569.1; 455/550.1; 455/420; 455/55; 379/106.02; 379/428.02; 379/433.01

(58) Field of Classification Search .............. 455/575.2, 455/41.1, 41.2, 569.1, 426.1, 420, 74, 550.1, 455/557, 575.1; 379/433.02
See application file for complete search history.

(56) References Cited

U.S. PATENT DOCUMENTS

| | | | | |
|---|---|---|---|---|
| 5,473,676 A | * | 12/1995 | Frick et al. ............... | 379/93.09 |
| 5,659,195 A | | 8/1997 | Kaiser et al. .............. | 257/415 |
| 5,663,507 A | | 9/1997 | Westervelt et al. .......... | 73/727 |
| 5,726,480 A | | 3/1998 | Pister ..................... | 257/415 |
| 5,881,377 A | * | 3/1999 | Giel et al. ................ | 455/343.1 |
| 5,978,689 A | * | 11/1999 | Tuoriniemi et al. ......... | 455/569.1 |
| 5,982,764 A | * | 11/1999 | Palermo et al. ............ | 370/345 |
| 5,983,100 A | * | 11/1999 | Johansson et al. .......... | 455/426.1 |
| 5,991,645 A | * | 11/1999 | Yuen et al. ............... | 455/575.2 |
| 6,012,822 A | | 1/2000 | Robinson ................. | 362/103 |
| 6,041,243 A | * | 3/2000 | Davidson et al. ........... | 455/575.1 |
| 6,107,930 A | * | 8/2000 | Behlke et al. .............. | 340/825.19 |
| 6,154,663 A | | 11/2000 | Itamochi | |
| 6,223,029 B1 | * | 4/2001 | Stenman et al. ............ | 455/420 |
| 6,230,029 B1 | * | 5/2001 | Hahn et al. ............... | 455/575.2 |
| 6,370,401 B1 | * | 4/2002 | Baranowski et al. ....... | 455/569.1 |
| 6,377,825 B1 | * | 4/2002 | Kennedy et al. ........... | 455/569.2 |
| 6,421,426 B1 | * | 7/2002 | Lucey .................... | 379/56.3 |
| 6,594,366 B1 | * | 7/2003 | Adams .................... | 381/74 |
| 6,606,506 B1 | * | 8/2003 | Jones ..................... | 455/566 |

FOREIGN PATENT DOCUMENTS

| | | |
|---|---|---|
| EP | 0 682 434 A2 | 11/1995 |
| JP | 11-308326 | 11/1999 |

OTHER PUBLICATIONS

Application Note AN-374 from Analog Devices, "Using Accelerometers in Low g Applications" by Charles Kitchin, Mar. 1995, 6 pages.

(Continued)

Primary Examiner—Marceau Milord
(74) Attorney, Agent, or Firm—Coats & Bennett, P.L.L.C.

(57) ABSTRACT

A wireless headset for use with a separate communications device, such as a cellular telephone, includes automatic on/off capabilities to maximize battery life. By detecting a user's interaction, such as picking up the headset or placing it upon the user's body, the wireless headset automatically transitions from an inactive state to an active state. Techniques for automatic headset enabling include but are not limited to motion sensors, attitude or position sensors, proximity sensors, and contact sensors. These techniques may be used individually or in any combination. An internal timer allows the wireless headset to return to its inactive state a defined interval after cessation of movement or removal of the wireless headset. Including an optional sleep state further optimizes battery life. In the sleep state, only a portion of the wireless headset circuitry is enabled. Rather than transitioning from inactive to active, the headset transitions from inactive to sleep. In sleep, the headset periodically monitors for a signal from the separate communications device. Upon detection of such a signal, the wireless headset transitions to its active state, thereby providing full functionality to the user.

9 Claims, 11 Drawing Sheets

OTHER PUBLICATIONS

Article from www.eetimes.com, "MEMS Accelerometer Designed Into Consumer Applications" by Stephan Ohr, Mar. 11, 1998, 3 pages.

Article from IBM Systems Journal, "Inertial Proprioceptive Devices: Self-Motion-Sensing Toys and Tools" by C. Verplaetse, May 10, 1996, 12 pages.

Dissertation Abstract from the Department of Electrical Engineering and Computer Sciences, University of California at Berkeley, "A Surface Micromachined Accelerometer with Integrated CMOS Detection Circuitry" by Weijie Yun, 1 page.

* cited by examiner

WIRELESS HEADSET WITH AUTOMATIC POWER CONTROL

FIELD OF THE INVENTION

The present invention relates to communications headsets such as might be used to interface with a cellular telephone and, in particular, to the design and operation of wireless headsets.

BACKGROUND OF THE INVENTION

Communications headsets provide a convenient interface to a variety of devices or base units, including telephones and computer systems. In particular, such headsets facilitate hands-free conversation using mobile terminals, such as cellular telephones. Of course, to impart practical advantages to hands-free conversation usage, such headsets must be convenient to wear and operate. Particularly, consumers desire small, lightweight headsets unencumbered by bulky and inconvenient cable attachments. Thus, communications headsets that are small and wireless are likely to enjoy widespread popularity, particularly if they are convenient to operate and own. Of course, the wireless headset must also provide for high-quality communications between it and the base unit. Several obstacles impede wireless headset designers in their efforts to provide consumers with small but reliable and convenient headsets.

One particular headset design problem is one of providing the user with a reliable mechanism for on/off control of the wireless headset. Continual reductions in the size of the elements comprising a typical wireless headset exacerbate the problem of locating a convenient and easy to operate on/off switch somewhere on the headset. Obviously, the relative size of the on-off switches used by designers must scale downward with the decreasing size of newer generation headsets. Small switches present a twofold problem. First, smaller switches are inherently more difficult to operate than larger ones. This problem is particularly acute for those with limited dexterity, poor eyesight, or compromised mental faculties. A second problem relates to the intrinsic shortcomings of inexpensive miniature switches. Namely, the second problem concerns overall switch reliability. Generally, the smaller switches are at once more fragile and less durable than their larger counterparts. Thus, inclusion of such miniaturized on-off switches compromises overall reliability of the wireless headset.

As the size of switches conveniently operable by the average user have a definite lower limit, the increasing miniaturization of wireless headsets leaves ever fewer convenient locations for incorporation of the on-off switch. Indeed, the design integrity of a wireless miniature headset may be compromised by the inclusion of any manually operated on-off switch. Such compromise results from the need to provide external access to the switch mechanism. This access generally requires an opening or break in the housing of the wireless headset. Such openings can compromise mechanical strength of the wireless headset housing and provide additional opportunities for the ingress of contaminants.

In keeping with the convenience afforded by their small size, miniature wireless headsets typically use internal batteries for operating power. Headset miniaturization places severe limitations on the physical size of batteries that may be included within the headset. Even with the significant energy densities afforded by newer battery technologies, these very small battery cells have significantly limited capacity. Because battery life is a key component of operator convenience, it is important that wireless headset design incorporates provisions maximizing battery life. A manually operated on-off switch works against this need to maximize battery life. For example, a user may forget to turn off the wireless headset after usage, thereby needlessly expending valuable battery life.

Accordingly, there remains a need for a wireless headset whose design and operation eliminates the need for bulky or hard to operate on-off switches, while maximizing battery life. The present invention satisfies these needs and others by providing a wireless headset capable of automatically turning on and off, based on user activity.

SUMMARY OF THE INVENTION

The present invention includes both a method and apparatus allowing a wireless headset to automatically control its operating state to minimize power consumption, thereby maximizing the life of its power source, such as a battery. The wireless headset serves as a communication accessory to a base unit, such as a cellular telephone. When not in use, the wireless headset reverts to an inactive state and draws essentially no power. A power control circuit imparts automatic enabling capability to the wireless headset. Preferably, the power control circuit employs a sensor responsive to a natural stimulus associated with a person preparing to use the wireless headset. The wireless headset may sense motion, physical orientation, or user proximity. Sensing techniques include but are not limited to micro-electro-mechanical-systems (MEMS), mercury switches, attitude switches, and IR or acoustic proximity sensors. In some embodiments, the wireless headset transitions from the inactive state to an active state in response to a user picking it up or mounting the wireless headset upon their head.

In a more sophisticated embodiment, the wireless headset may transition from the inactive state to a sleep state, based on user stimulus. In the sleep state, only a portion of the headset circuitry is enabled, thus conserving power. While in the sleep state, the wireless headset monitors for a signal from the base unit, and, when such a signal is received, it transitions from the sleep state to the active state. Further, once active, the wireless headset can continue to monitor for communications link activity. Thus, if communications with the base unit cease, the wireless headset can return to the sleep state and periodically check for resumed communications activity. A timer allows the wireless headset to automatically return to the inactive state subsequent to use. Cessation of movement or detected removal of the wireless headset from the user's head can indicate termination of use and trigger a timed power-down.

DETAILED DESCRIPTION OF THE INVENTION

Figure 1:
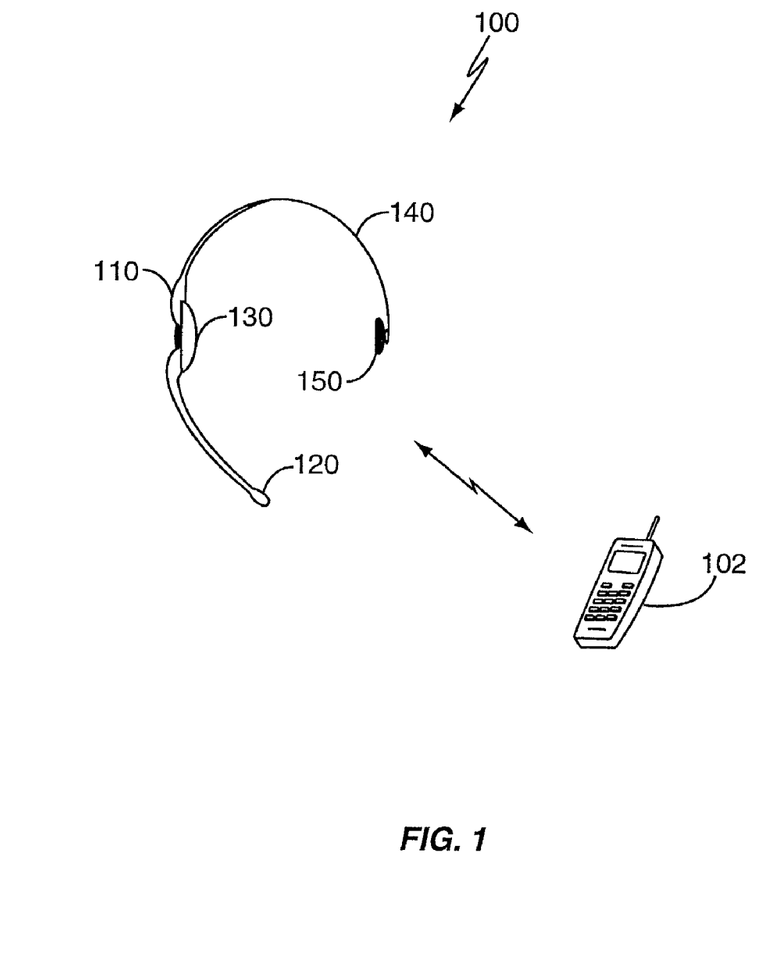
FIG. 1 illustrates an exemplary configuration of the wireless headset of the present invention.

FIG. 1 illustrates one embodiment of the wireless headset 100 of the present invention. A user may advantageously use the wireless headset 100 for more convenient, hands-free interaction with the base unit 102. As noted, the base unit 102 may be any type of device supporting interactive communications with a user. Commonly, the base unit 102 will be a communications device, such as a mobile terminal. The basic elements of the wireless headset 100 include a microphone pickup 120 for audio input, an earpiece 130 for audio output, a primary enclosure 110, and a retaining member 140 with pad 150 to aid in securing the wireless headset 100 to the user's head. Notably, FIG. 1 represents an exemplary configuration for the wireless headset 100. The physical configuration shown in FIG. 1 is a common configuration for wireless headsets. However, other configurations are possible. Those skilled in the art will appreciate that the physical configuration of the headset is not a material aspect of the invention.

Figure 2A:
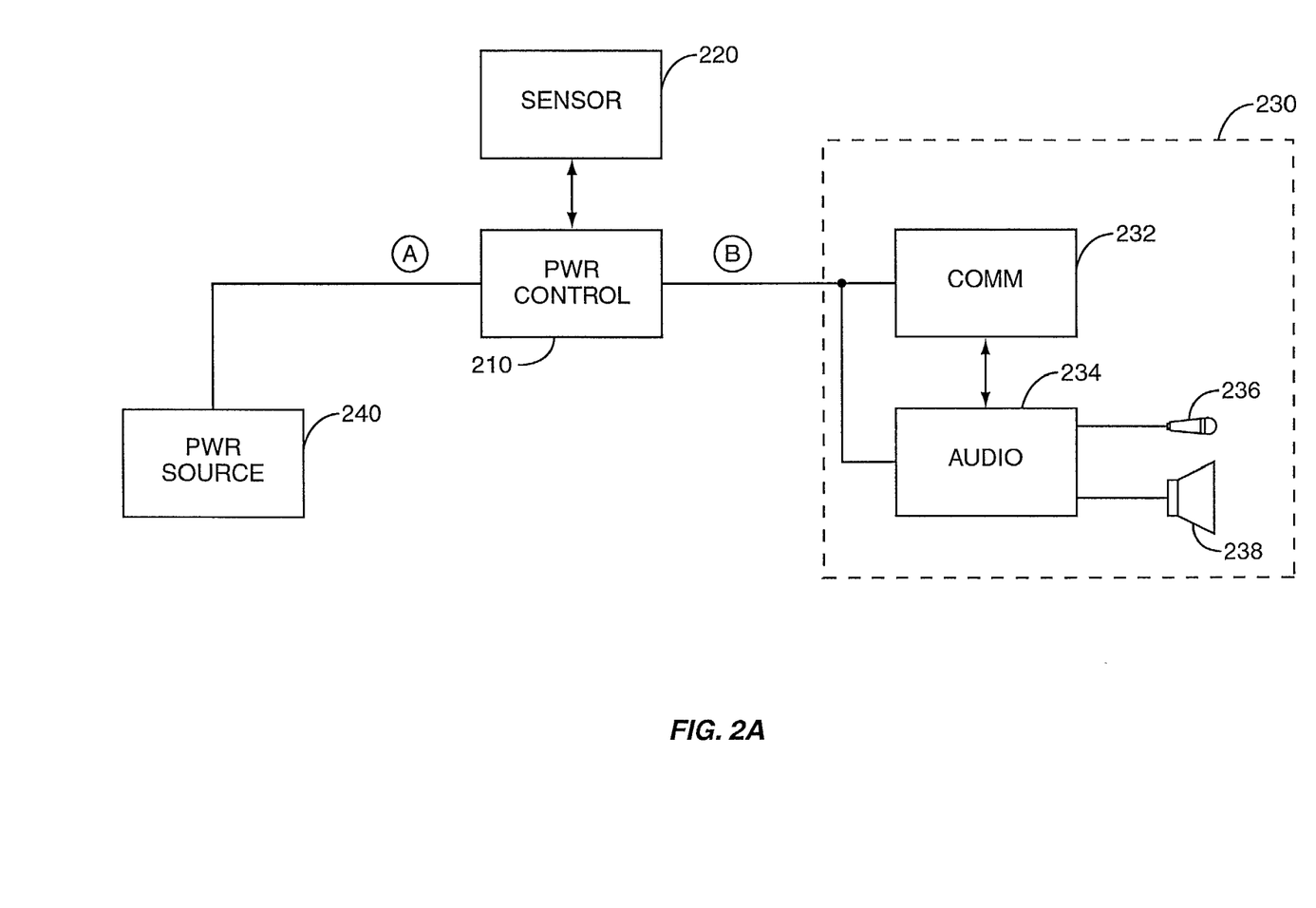
FIG. 2A is a simplified functional block diagram of the wireless headset in one exemplary embodiment of the present invention.

Regardless of physical configuration, FIG. 2A illustrates one embodiment for the functional structure of the wireless headset 100 in accordance with one embodiment of the present invention. Wireless headset 100 includes a communications circuit 230 (also referred to as a headset circuit), a power control circuit 210, a sensor 220, and a power source 240.

The communications circuit 230 provides wireless headset functionality, including audio input and output and wireless communications with the base unit 102. The communications or headset circuit 230 includes a wireless communications interface 232 providing a wireless communications link for sending and receiving information to and from the base unit 102. The wireless communications interface 232 includes at least a wireless receiver and wireless transmitter. Audio input received via microphone 236 is conditioned by the audio interface 234 and then processed by the communications interface 232 for transmittal to the base unit 102. Audio information received from the base unit 102 is processed by the wireless communications interface 232 and then conditioned in the audio interface 234 for output to a user via speaker 238. With reference to FIG. 1A or 1B, the microphone 236 may be located in microphone pickup 120, and speaker 238 may be located in earpiece 130.

The power control circuit 210 selectively enables (activates) the communications circuit 230 in response to an output from sensor 220. In some embodiments, the power control circuit 210 controls whether the communications circuit 230 is connected to the power source 240. In other embodiments, the power control circuit 210 controls the amount of power consumed by communications circuit 230. Conventionally, the power source 240 is a battery.

The communications circuit 230, power control circuit 210, sensor 220, and power source 240, may all be contained in the primary enclosure 110, or may be distributed elsewhere in the structure of the wireless headset 100. The specific packaging of the various elements comprising the wireless headset 100 is not critical to practicing the present invention.

Figure 2B:
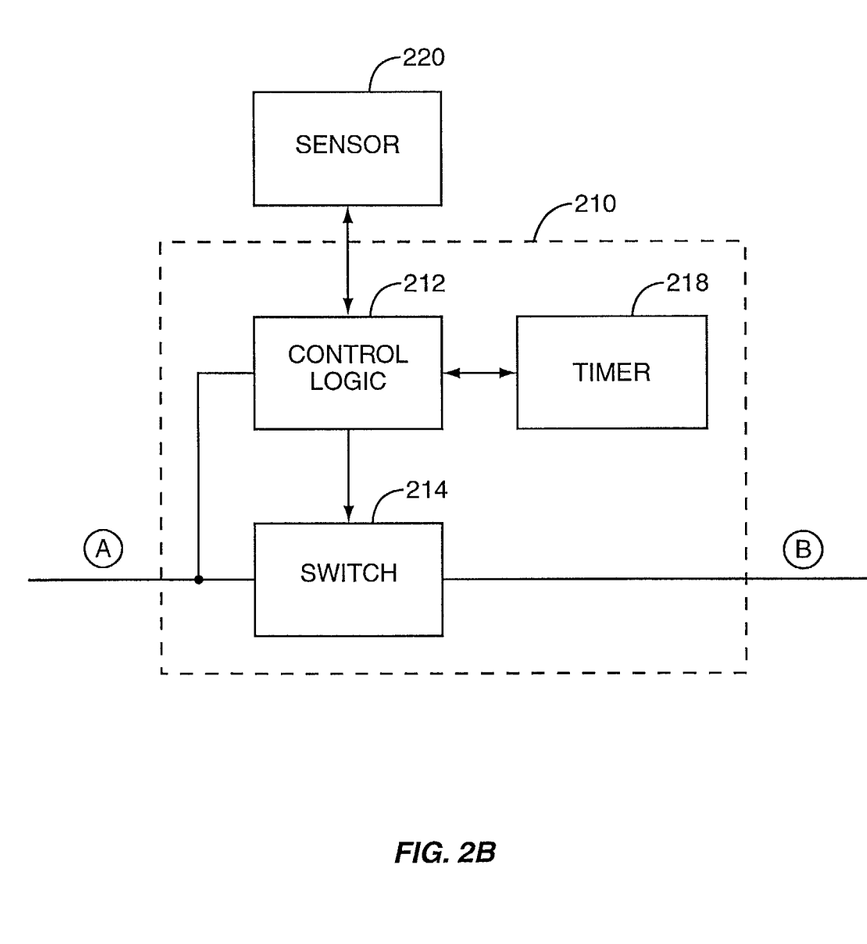
FIG. 2B is a more detailed functional block diagram of a power control circuit in one exemplary embodiment of the present invention.

FIG. 2B provides more detail regarding the power control circuit 210 and sensor 220. The interface between the power control circuit 210 and sensor 220 comprises one or more signal lines, and can include a power connection. The power control circuit 210 includes control logic 212 that is operatively associated with a switch 214. In response to a sensor output signal, the control logic 212 causes switch 214 to turn on, thereby enabling or powering the communications circuit 230. The power control circuit 210 includes a timer 218 that is reset by the control logic 212 based on the sensor output signal. The control logic 212 starts the timer 218 upon enabling the communications circuit 230. Subsequent or continued assertion of the sensor output signal by the sensor 220 causes the control logic 212 to periodically reset the timer 218, thereby preventing its expiration. As an alternative to periodic resetting, continued assertion of the sensor output signal may cause the power control circuit 210 to hold the timer 218 in reset. Absent such resetting, the timer 218 expires after timing a defined interval of time. Upon expiration of the timer 218, the power control circuit 210 disables the communications circuit 230.

Figure 3A:
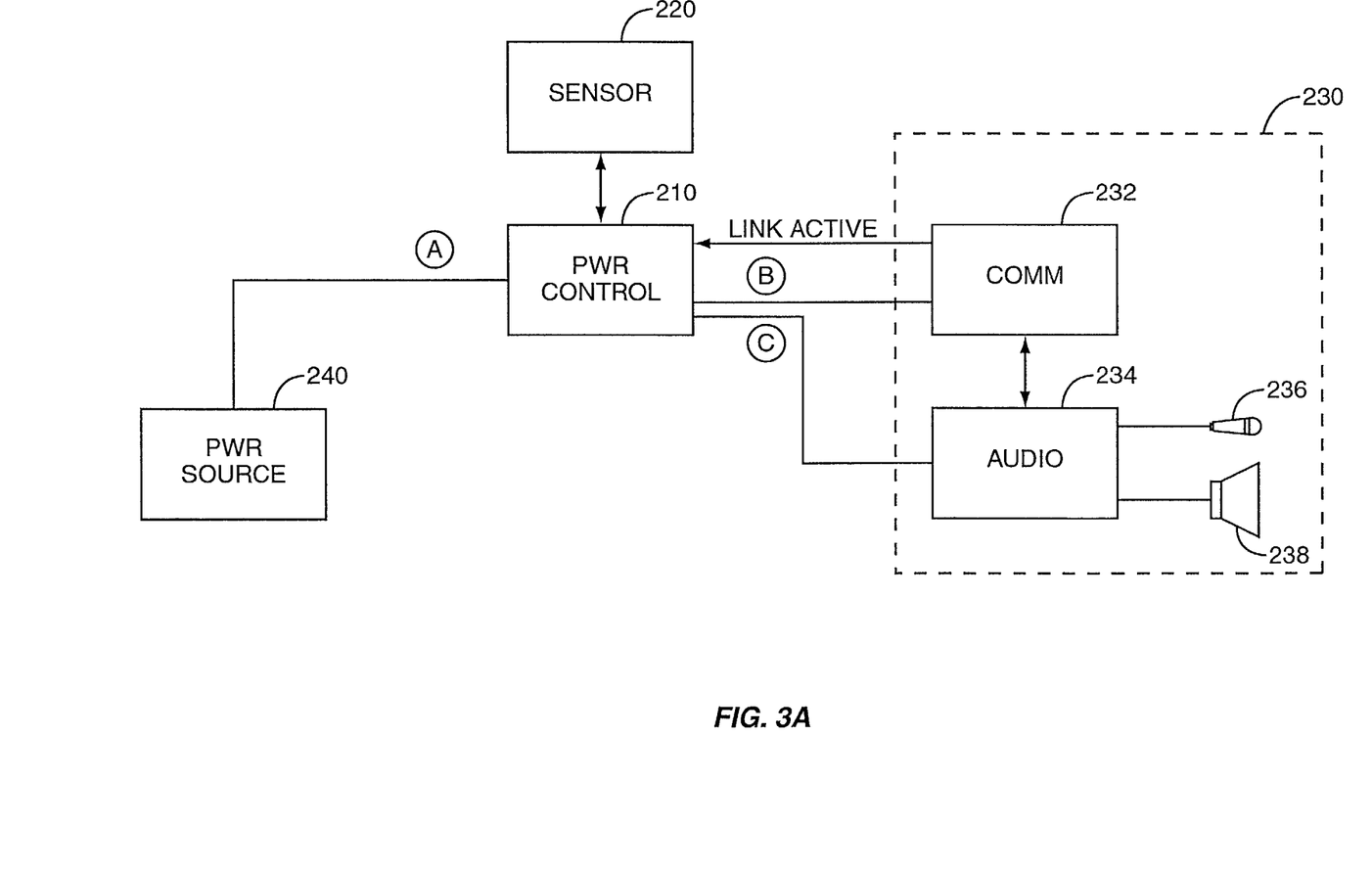
FIG. 3A is a simplified functional block diagram of the wireless headset in a preferred embodiment of the present invention.

FIG. 3A illustrates a preferred embodiment for the wireless headset 100. In FIG. 3A, the power control circuit 210 independently enables the wireless communications interface 232 and audio interface 234. Thus, select portions of communications circuit 230 may be enabled in response to the sensor output signal. Once the wireless communications interface 232 is enabled, it provides a signal, termed a "link active" signal, to the power control circuit 210 based on detecting a wireless signal received from the base unit 102. Based on the assertion of the link active signal, the power control circuit 210 enables the audio interface 234.

Figure 3B:
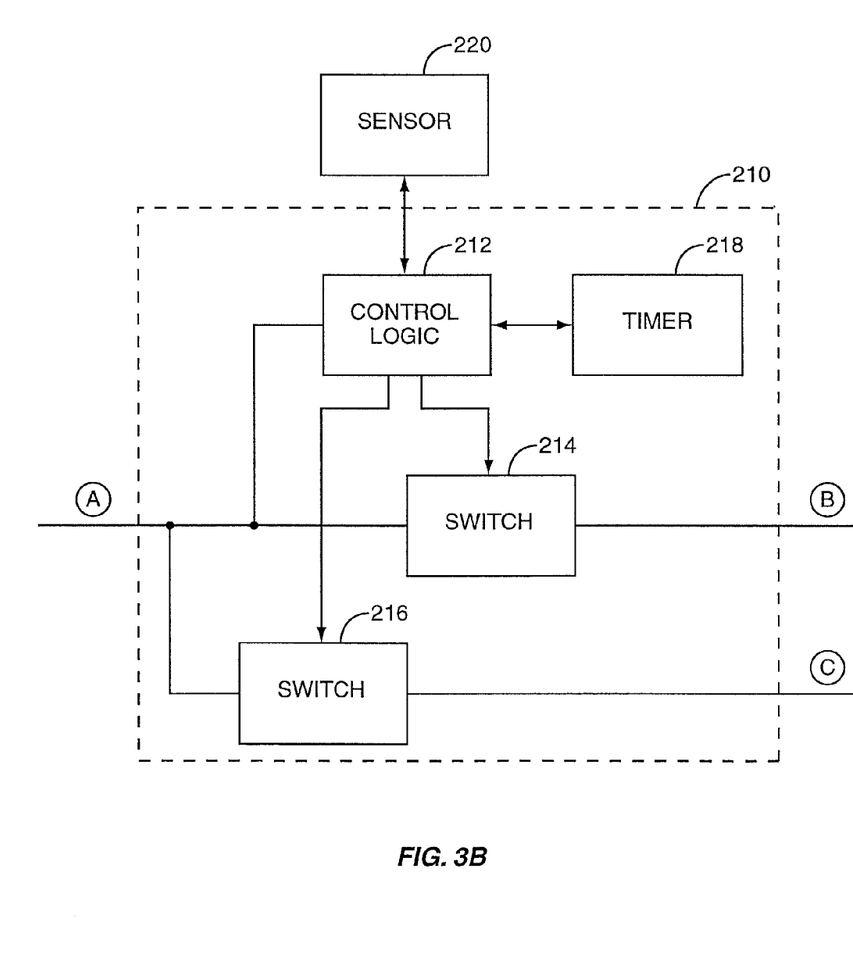
FIG. 3B is a more detailed functional block diagram of the power control circuit in a preferred embodiment of the present invention.

FIG. 3B provides more functional details regarding the power control circuit 210 of FIG. 3A. Again, the control logic 212 is responsive to a sensor output signal from sensor 220. However, in response to the sensor output signal, the control logic 212 turns on switch 214 while switch 216 remains off, thereby enabling the wireless communications interface 232. As with the previously discussed embodiment, power control circuit 210 includes the timer 218. In a preferred embodiment, control logic 212 starts timer 218 upon enabling the wireless communications interface 232, and resets timer 218 based on subsequent or continued assertion of the sensor output signal. If the wireless communications interface 232 asserts the link active signal, the control logic 212 turns on switch 216, thereby enabling the audio interface 234. If the timer 218 expires, the control logic 212 turns off switches 214 and 216, thereby disabling the wireless communications interface 232 and the audio interface 234.

Because the wireless headset 100 of the present invention automatically enables and disables its communication functions based on use, the sensor 220 may be based on a variety of technologies. In general, its purpose is to provide a signal responsive to a natural stimulus associated with use of the headset by a user. Movement or vibration of the wireless headset 100, or placement of the wireless headset 100 upon the user's body indicates usage. Movement may be detected based on vibration or by sensing acceleration, such as with an accelerometer. Mechanical or liquid-based switches represent alternate mechanisms for sensing movement. In such switches, movement causes an electrical connection to be established between contact pairs. Further, the particular sensor 220 employed may be tuned or configured such that only stimulus consistent with actual use actuates the sensor, thus avoiding inadvertent or unintended enabling of the wireless headset 100. In such configurations, the sensor 220 preferably employs output conditioning that prevents assertion of the sensor output signal for stimulus below a defined threshold. Alternatively, the power control circuit 210 may include such conditioning as part of its interface to the sensor 220. FIGS. 4A–4D illustrate possible sensor embodiments.

Figure 4A:
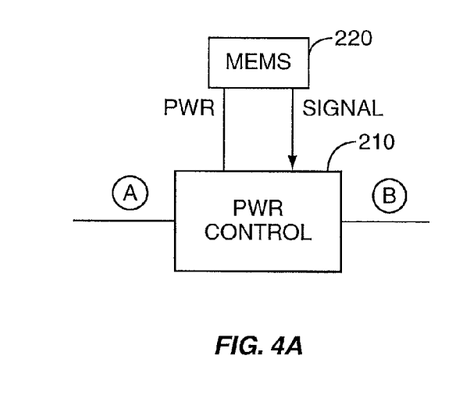
FIG. 4A is a simplified block diagram of the power control circuit with a MEMS sensor.

In FIG. 4A, the power control circuit 210 is operatively associated with a MEMS device, with the MEMS device functioning as the sensor 220. Devices based on MEMS technology may be responsive to general vibration or motion, or may be configured to respond only to specific acceleration along defined axes. As MEMS devices may easily include output conditioning electronics, the sensitivity or responsiveness of the sensor 220 incorporating the MEMS device may be tailored such that the sensor output signal is asserted only for motion or vibration above a certain threshold. A typical MEMS employs modified microelectronics fabrication techniques and includes small mechanical elements responsive to movement or vibration, such as cantilever beams formed by selectively etching a silicon wafer. In a preferred embodiment of the present invention, sensor 220 includes a MEMS device simultaneously fulfilling the requirements of low power consumption, relative low-cost, and adequate signal discrimination. In this context, signal discrimination means that the sensor 220 is not prone to nuisance assertions of its sensor output signal caused by minute movement or vibration. Although the body of work associated with MEMS technology is quite comprehensive, significant insight into the basic structures and techniques of MEMS technology may be gained from U.S. Pat. No. 5,659,195 to Kaiser et al., U.S. Pat. No. 5,663,507 to Westervelt et al., and U.S. Pat. No. 5,76,480 to Pister, the disclosures of which are incorporated herein by reference.

Figure 4B:
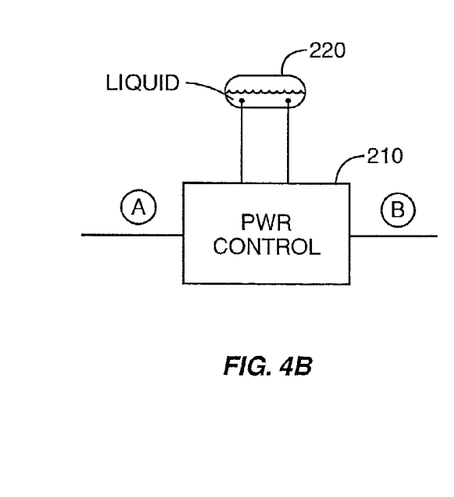
FIG. 4B is a simplified block diagram of the power control circuit with a liquid-based switch.

FIG. 4B illustrates the power control circuit 210 coupled to a liquid-based switch functioning as the sensor 220. The sensor 220 may be a mercury-filled switch, or may employ other conductive liquids. Depending upon its configuration, the sensor 220, implemented as a liquid-based switch, may function as a motion sensor or as an attitude sensor. As a motion sensor, the sensor 220 includes first and second contacts disposed in a manner such that motion of the contained liquid places the first and second contacts in electrical connection. As an attitude sensor, sensor 220 includes first and second contacts disposed in a manner such that one or more specific physical orientations of the wireless headset 100 causes the contained liquid in sensor 220 to place the first and second contacts in electrical connection. The power control circuit 210 connects to the first and second contacts of sensor 220, and is responsive to the electrical connection completed by the contained liquid.

Figure 4C:
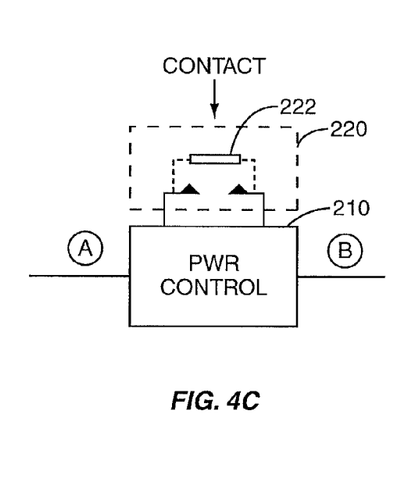
FIG. 4C is a simplified block diagram of the power control circuit with a contact switch.

FIG. 4C illustrates the power control circuit 210 coupled with a contact switch functioning as the sensor 220. The contact switch includes a first and second contact connected to the power control circuit 210, and connecting member 222 actuated when the user places the wireless headset 100 on their body. When actuated, the connecting member 222 places the first and second contacts of sensor 220 in electrical connection. Ideally, the sensor 220, when configured as a contact sensor, is placed in the earpiece 130, in the retaining member 140, or in the retaining pad 150 shown in FIG. 1B. Preferably, when sensor 220 is configured as a contact-based proximity sensor, the contacting element of sensor 220 is sealed in a manner that minimizes contaminant ingress. In some embodiments, the contact sensor may be actuated by the user resiliently expanding the retaining member 140 or other element of the wireless headset 100 for mounting upon their body.

Figure 4D:
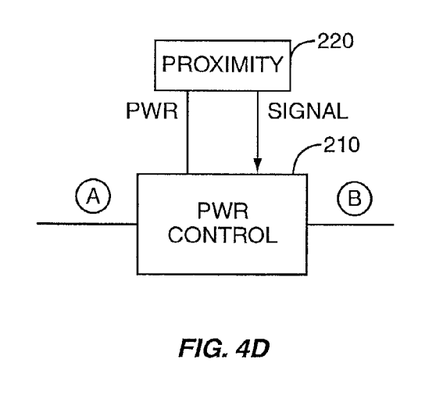
FIG. 4D is a simplified block diagram of the power control circuit with an IR sensor.

FIG. 4D illustrates the power control circuit 210 coupled with a proximity sensor 220 not based on mechanical actuation. The proximity sensor 220 may be an active or passive IR sensor, may be a resistive or other type of thermal sensor, or may be an acoustic sensor. As a proximity sensor, sensor 220 provides indication that a user has placed the wireless headset 100 upon their body. As such, any of the foregoing or other presence sensing techniques may be used to implement sensor 220. Preferably, when configured as a proximity sensor, sensor 220 requires minimal power and provides a sensor output signal based on proximity to the user's body. Depending upon the sensing technology chosen, the control circuit 210 may be required to periodically stimulate sensor 220 to generate a detection response.

Figure 4E:
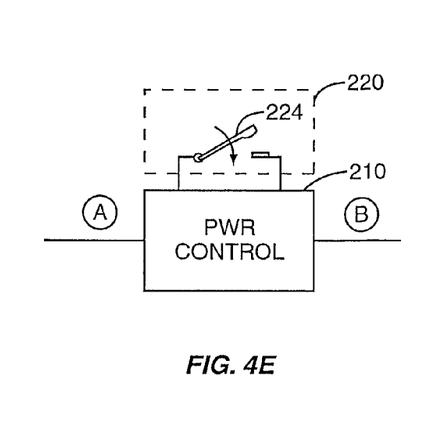
FIG. 4E is a simplified block diagram of the power control circuit with a mechanical position switch.

FIG. 4E illustrates the power control circuit 210 coupled to an alternate type of attitude sensor 220. In this embodiment, the attitude sensor 220 is a mechanical sensor that includes a contacting member 224 responsive to a physical orientation of the sensor 220. In one or more physical orientations, the contacting member 224 does not electrically connect the first and second contacts of attitude sensor 220. In one or more other physical orientations, the contacting member places the first and second contacts of attitude sensor 220 in electrical connection. The power control circuit 210 is configured to be responsive to this electrical connection. Contacting member 224 may be resiliently biased away from one or both contacts to ensure an open electrical connection between contacts when the headset is not oriented in a position indicative of use.

Figure 5:
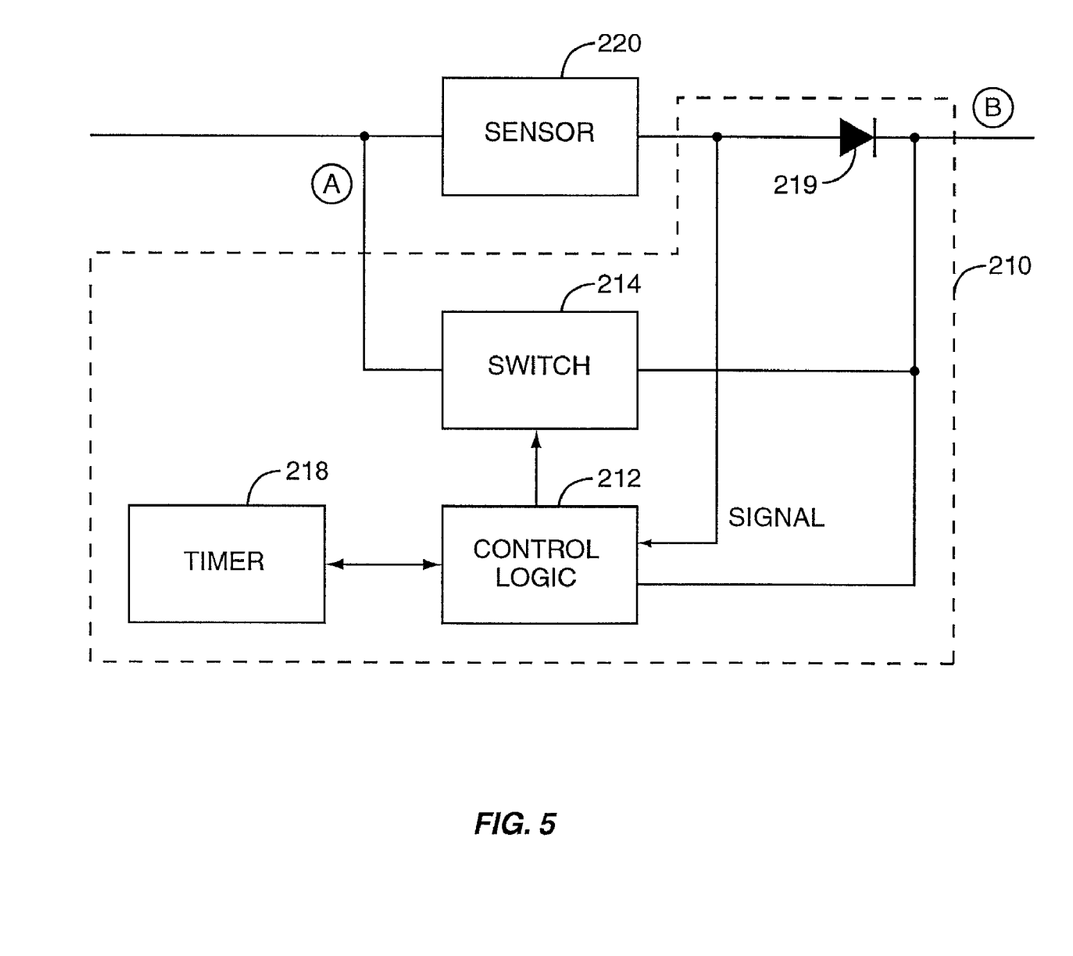
FIG. 5 is a simplified functional block diagram of the sensor and power control circuit in an alternate embodiment of the present invention.

FIG. 5 illustrates yet another embodiment of the power control circuit 210 and associated sensor 220 in accordance with the present invention. Here, the sensor 220 in itself functions as a switch and provides a connection between the power source 240 and the power control circuit 210. The power control circuit 210 also includes a switched power output from switch 214 that is commonly connected with the switched power output from sensor 220. A blocking device 219, such as a diode, allows the power control circuit 210 to determine if there is electrical continuity through sensor 220. In the presence of such continuity, the control logic 212 turns on switch 214 thereby providing an independent power connection from the power source 240 to the communications circuit 230. As before, the power control circuit 210 includes the timer 218 that is started when switch 214 is turned on, and restarted based on electrical continuity through sensor 220. If the timer 218 expires due to an absence of electrical continuity through sensor 220, the control logic 212 disables the communications circuit 230.

Note that the foregoing diagrams illustrate various configurations for the present invention, with these configurations allowing the wireless headset 100 to automatically enable and disable select portions of its electronic circuitry based on user stimulus. Enabling and disabling may constitute physical connection and disconnection of power between the power source 240 and the communications or headset circuit 230, or may simply represent the assertion and de-assertion of specific enabling signals. Thus, the foregoing diagrams should not be construed as limiting in any way regarding the specific circuit implementation of the wireless headset 100. FIGS. 2–5 illustrate functional diagrams and these various functions may have corresponding separate circuit elements, or may be included in integrated fashion in one or more devices. For example, a microprocessor in a sleep or halt mode may be directly connected to a battery and configured to wake up in response to an input from the sensor 220. Thus, the microprocessor could serve as the power control circuit 210, as well as providing functions related to the communications interface 232 and audio interface 234.

Figure 8:
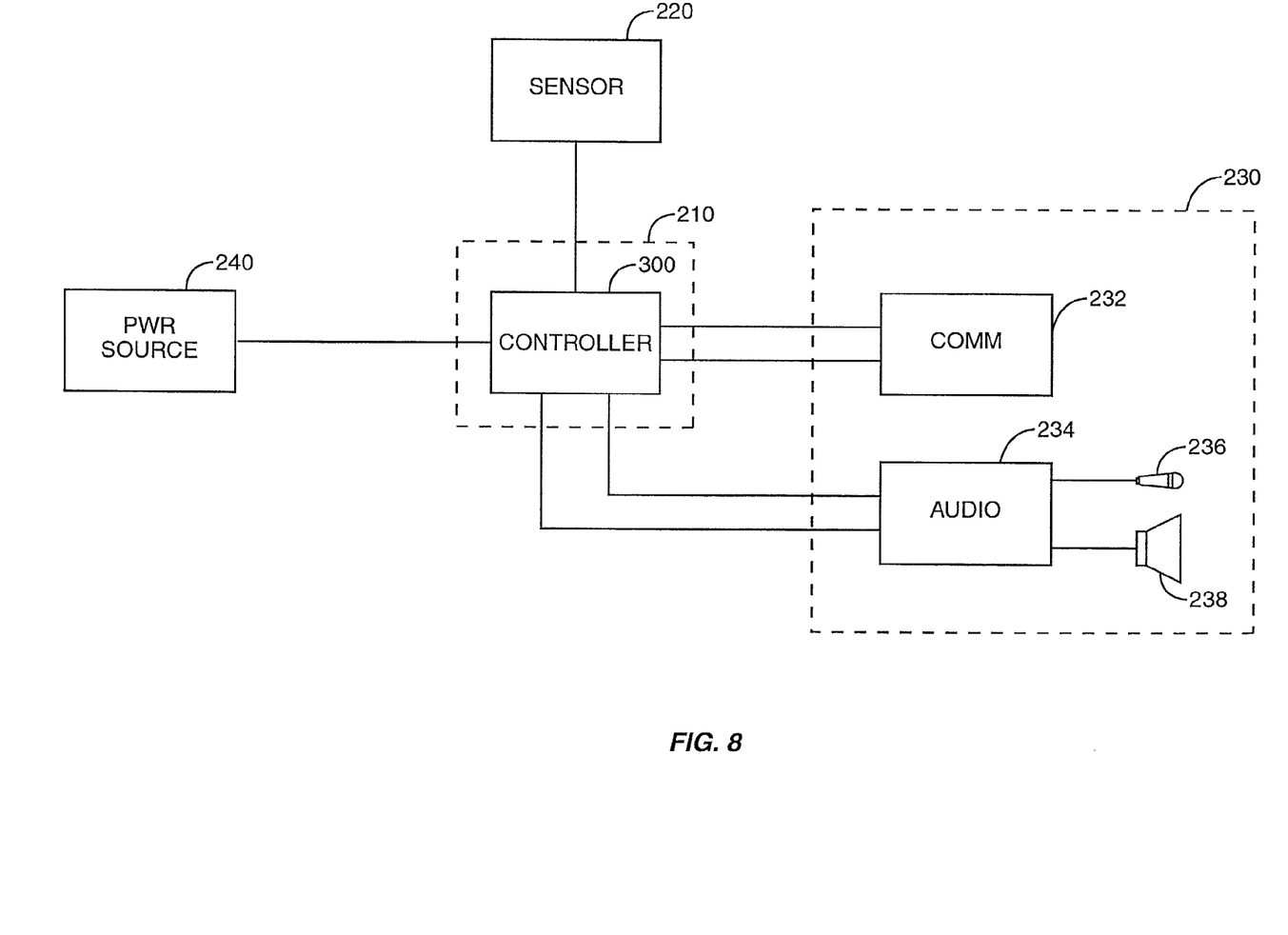
FIG. 8 is a simplified block diagram for an exemplary embodiment of the present invention using an integrated controller for power control.
Figure 9:
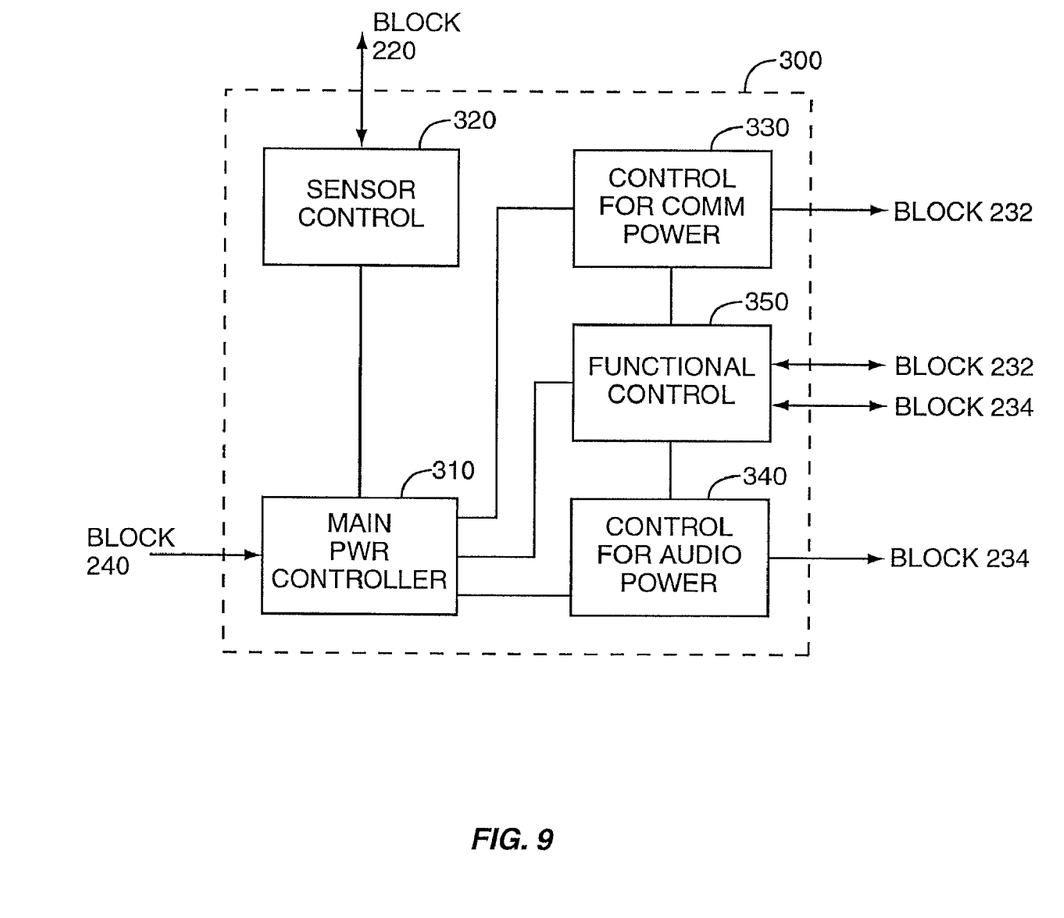
FIG. 9 is a simplified block diagram providing more detail regarding the integrated controller of FIG. 8.

FIGS. 8 and 9, in particular, illustrate an exemplary embodiment of the present invention wherein an integrated controller provides the functionality of the power control circuit 210. In FIG. 8, the power control circuit 210 includes an integrated controller 300. The integrated controller 300 provides power control functionality associated with the timer 218, switches 214 and 216, and control logic 212. In this embodiment, the controller 300 provides both power and control/signal interconnections for the wireless communications interface 232 and audio interface 234. The controller 300 independently enables the wireless communications interface 232 and audio interface 234 in response to the sensor output signal from sensor 220. As with other embodiments, the controller 300 may enable both the wireless communication interface 232 and audio interface 234 in response to the sensor output signal, or may only enable the wireless communications interface 232, or a portion thereof. In this latter, case, the controller 300 enables the audio interface 234 in response to receiving the link signal from the enabled portion of the wireless communications interface 232.

FIG. 9 provides more detail regarding the controller 300 shown in FIG. 8. A main power controller 310 provides power/control outputs to power controllers 330 and 340, which, in turn, provide power control outputs to the wireless communications interface 232 and audio interface 234, respectively. The main power controller 310 additionally interfaces with and provides power to a functional controller 350 and a sensor controller 320. The functional controller 350 provides signal and control interfaces with both the wireless communications interface 232 and the audio interface 234. In an exemplary embodiment, the main power controller initially enables only the sensor controller 320.

Then, in response to the sensor output signal, the main controller 310 enables power controller 330 at least a portion of the functional controller 350. In response, power controller 330 enables at least a portion of the wireless communications interface 232. Then, in response to receiving the link signal from the wireless communications interface 232—the link signal may be received via the functional controller 350—the main power controller 310 enables the power controller 340 associated with the audio interface 234. The power controllers 330 and 340 may comprise FET switches combined with control logic responsive to control signals asserted by the main power controller 310, the functional controller 350, and/or the wireless communications interface 232.

The specific configuration of the integrated controller 300 illustrated in FIGS. 8 and 9 will depend upon particular design requirements and available system resources. The integrated controller 300 may be a microprocessor, ASIC, or other programmable logic device and, as such, the features and capabilities of the selected architecture will determine the specific implementation for such embodiments.

Figure 6:
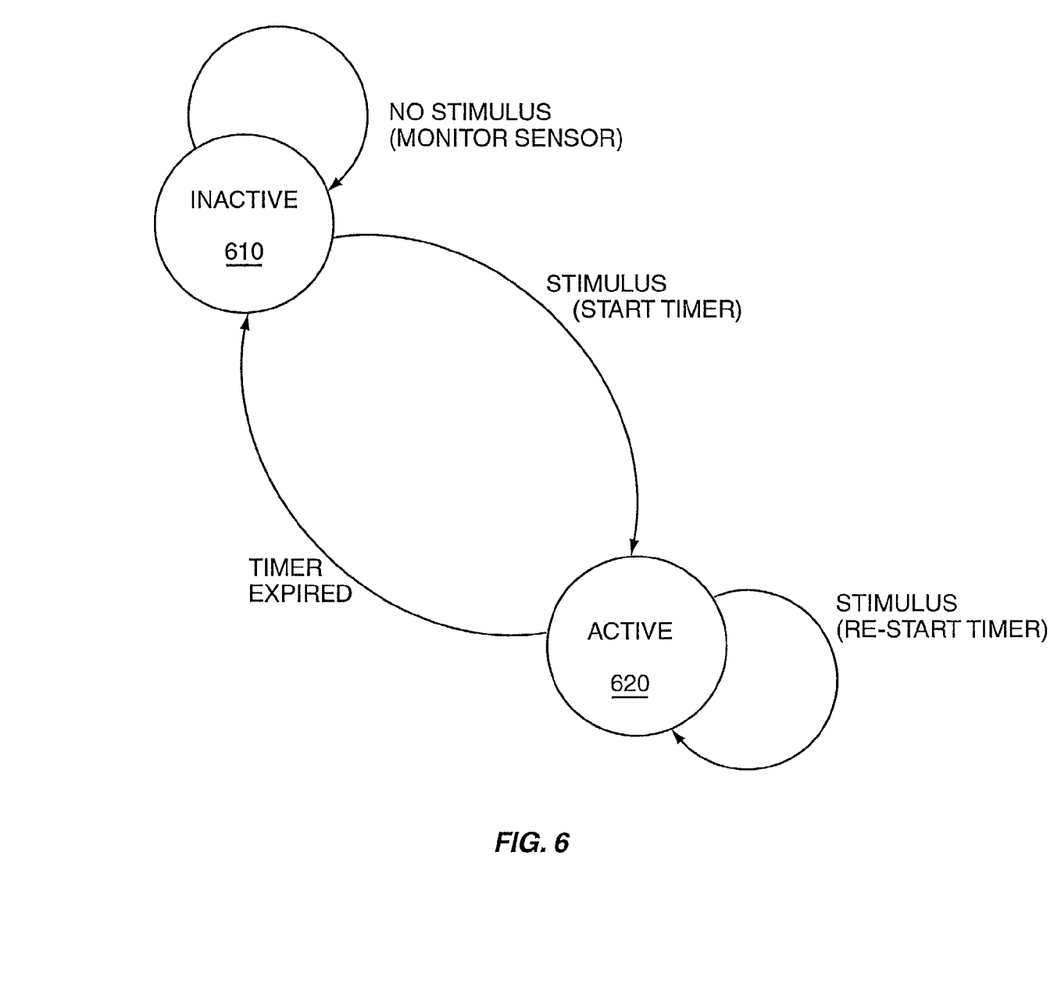
FIG. 6 is a state diagram of basic wireless headset operation in one embodiment of the present invention.
Figure 7:
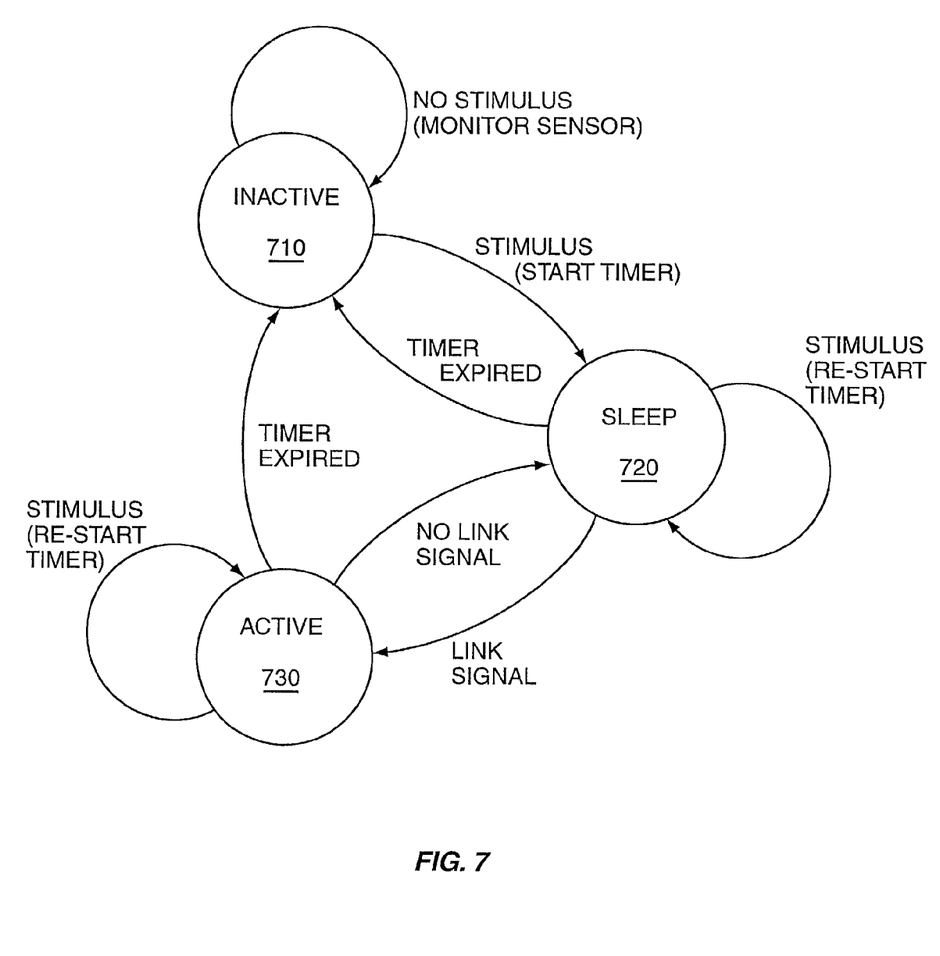
FIG. 7 is a state diagram of basic wireless headset operation in a preferred embodiment of the present invention.

FIGS. 6 and 7 illustrate operation of the wireless headset 100. FIG. 6 is a state diagram for one exemplary embodiment of the present invention. When the wireless headset 100 is not in use, it automatically enters an inactive state (610). As explained, this inactive state may constitute disconnecting the communications circuit 230 from the power source 240, or may simply represent placing the communications circuit 230 in a non-functional, low-power condition. Absent user stimulus, such as motion of the wireless headset 100 or placement of the wireless headset 100 upon the user's body, the wireless headset 100 remains in the inactive state (610).

In response to user stimulus, as detected by sensor 220, the power control circuit 210 enables the communications circuit 230, with this enabling representing a transition from the inactive state to an active state (620). Upon entering the active state, the power control circuit 210 initializes and starts the timer 218. The timer 218 incrementally counts from a starting value to an ending value, with the progression from starting to ending values representing a defined interval of time. Upon expiration of the timer 218, the power control circuit 210 disables the communications circuit 230. This interval of time may be preprogrammed to a convenient value, or may be selectable based on input from the base unit 102. For example, a timeout interval of five minutes may provide a reasonable compromise between user convenience and battery life. While in the active state (620), the power control circuit 210 resets the timer 218 based on the reassertion or continued assertion of the sensor output signal from sensor 220. Such resetting prevents expiration of the timer 218 and, as such, causes the power control circuit 210 to leave the communications or headset circuit 230 enabled. Thus, the power control circuit 210 is designed to leave the wireless headset 100 in the active state (620) while the wireless headset is in use by a user. Absent user stimulus, the timer 218 of power control circuit 210 expires, thereby causing the wireless headset 100 to transition from the active state (620) to the inactive state (610) based on the power control circuit 210 disabling the communications circuit 230.

FIG. 7 is a state diagram for a preferred embodiment of the present invention. Operation of the wireless headset 100 illustrated in FIG. 7 is distinguished from that shown in FIG. 6 by inclusion of an additional state, denoted as the sleep state (720). Inclusion of the sleep state provides an additional opportunity to control the power consumption of wireless headset 100 based on specific operating conditions. As before, the wireless headset 100 remains in the inactive state (710) absent user stimulus. Upon detecting user stimulus, the wireless headset 100 transitions from the inactive state (710) to the sleep state (720). In this state, the power control circuit 210 enables only a portion of the communications circuit 230. Specifically, the power control circuit 210 enables the wireless communications interface 232 or a portion thereof. Then, using a signal output from the wireless communications interface 232, the power control circuit 210 determines if the base unit 102 is active, or if the base unit 102 is attempting to communicate with the wireless headset 100. In some embodiments, the wireless headset 100 infers activity by detecting, via its wireless communications interface, a carrier signal from the base unit 102. In other embodiments, the wireless headset detects activity based on receiving a "wake-up" signal from the base unit 102. Note that monitoring for the base unit carrier signal may be performed continuously by the wireless headset 100 while in the sleep state, or may be performed periodically; thereby further reducing sleep state power consumption. For periodic carrier monitoring, the wireless headset 100 may employ an exemplary monitoring interval of 0.5 seconds.

Upon detecting the carrier signal or wake-up signal from the base unit 102, as indicated by the link signal shown in FIG. 7, the wireless headset 100 transitions from the sleep state (720) to the active state (730). To further reduce power consumption, the wireless headset 100 may only monitor for the external signal on a periodic basis. If the wireless headset 100 is configured to monitor for the external signal on a periodic basis and the base unit 102 is configured to emit a periodic wake-up signal, the periodic monitoring of the wireless headset 100 is set such that its monitoring frequency is not an integer multiple of the wake-up signal frequency. Upon causing the wireless headset 100 to transition from the inactive state (710) to the sleep state (720), the power control circuit 210 initializes and starts the timer 218.

While in the sleep state (720), subsequent or continued assertion of the sensor output signal from the sensor 220 causes the power control circuit 210 to reset its timer 218. Absent such user stimulus, the timer 218 expires and the power control circuit 210 disables the communications circuit 230. After transitioning from the sleep state (720) to the active state (730), based on detection of the signal from the base unit 102, the power control circuit 210 continues resetting its timer 218 based on user stimulus, as done in the sleep state (720). Thus, continued user stimulus causes the power control circuit 210 to leave the wireless headset 100 fully functional in the active state (730).

The present invention provides methods and apparatus allowing the wireless headset 100 to conveniently transition from a non-functional inactive state to a fully functional active state, based on its detection of certain user stimulus. In a preferred embodiment, the wireless headset 100 transitions from the inactive state to the intermediate sleep state, thereby conserving power. Upon detection of the carrier or the wake-up signal from the base unit 102, the wireless headset 100 transitions from the sleep state to the fully functional active state. The wireless headset 100 includes a sensor 220 for detecting the user stimulus. As the sensor 220 may be a motion sensor, a vibration sensor, an attitude sensor, or a proximity sensor, the specific user stimulus may include the user moving and/or placing the wireless headset 100 upon their body. The operation of the wireless headset 100 in accordance with the present invention admits tremendous flexibility with respect to implementation. As noted, many different circuit implementations may provide the inventive features of the present invention. These implementations may include hardware and software, and can reflect varying degrees of integration between the functional circuit blocks discussed. Indeed, all such variations for providing a wireless headset 100 that automatically controls its power consumption or operating state based on detection of a user stimulus are within the scope of the present invention.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling a wireless headset including a control circuit and a communications circuit, said communications circuit having a wireless communications interface and an audio interface, comprising the steps of:
   placing said communications circuit in an inactive state via said control circuit;
   detecting a predetermined condition via a sensor disposed in said wireless headset and associated with said control circuit while said headset circuit is in said inactive state;
   transitioning, via said control circuit, said headset circuit from said inactive state to a sleep state in response to said detection, wherein at least a portion of said communications circuit is enabled in said sleep state;
   detecting, via said enabled portion of said communications circuit, an activity signal from a base unit while said communications circuit is in said sleep state; and
   transitioning, via said control circuit, said communications circuit from said sleep state to an active state in response to said activity signal, wherein all of said communications circuit is enabled in said active state.

2. The method of claim 1 further including continuing to monitor, via said control circuit and said associated sensor, for said predetermined condition while said communications circuit is in said sleep state and while said communications circuit is in said active state.

3. The method of claim 2 wherein said step of transitioning said communications circuit from said inactive state to said sleep state includes starting a timer defining a time-out interval.

4. The method of claim 3 wherein said control circuit transitions said communications circuit from said active state or said sleep state back to said inactive state upon expiration of said timer.

5. The method of claim 4 wherein said control circuit resets said timer, thereby preventing its expiration, in response to detecting said predetermined condition during said continued monitoring.

6. The method of claim 1 wherein said predetermined condition is a movement of said wireless headset and said sensor is a motion sensor.

7. The method of claim 1 wherein said predetermined condition is a positioning of said wireless headset in one or more physical orientations and said sensor is an attitude sensor.

8. The method of claim 1 wherein said predetermined condition is proximity of said wireless headset to a user's body and said sensor is a proximity sensor.

9. The method of claim 1 wherein said predetermined condition is contact between said wireless headset and a user's body and said sensor is a contact sensor.

* * * * *